(12) United States Patent
Gebert et al.

(10) Patent No.: US 11,168,788 B2
(45) Date of Patent: Nov. 9, 2021

(54) PARKING LOCK MODULE FOR ACTUATING A PARKING LOCK IN A MOTOR VEHICLE

(71) Applicant: FTE automotive GmbH, Ebern (DE)

(72) Inventors: Stefan Gebert, Ebern (DE); Steve Selch, Ebern (DE); Andreas Schwipp, Ebern (DE)

(73) Assignee: FTE automotive GmbH, Ebern (DE)

(*) Notice: Subject to any disclaimer, the term of this patent is extended or adjusted under 35 U.S.C. 154(b) by 71 days.

(21) Appl. No.: 16/507,091

(22) Filed: Jul. 10, 2019

(65) Prior Publication Data
US 2020/0040994 A1 Feb. 6, 2020

(30) Foreign Application Priority Data
Aug. 3, 2018 (DE) .................. 10 2018 006 098.6

(51) Int. Cl.
*F16H 63/34* (2006.01)
(52) U.S. Cl.
CPC ..... *F16H 63/3483* (2013.01); *F16H 63/3475* (2013.01); *F16H 63/3433* (2013.01)
(58) Field of Classification Search
CPC ... F16H 63/3433; F16H 63/3458–3475; F16H 63/3483
See application file for complete search history.

(56) References Cited

U.S. PATENT DOCUMENTS 7,861,839 B2 * 1/2011 Schweiher ............ F16H 63/483
192/220.2
8,667,859 B2 * 3/2014 Engel ...................... F16H 61/30
74/473.11
(Continued)

FOREIGN PATENT DOCUMENTS

DE 10 2005 043 033 B3 4/2007
DE 10 2007 006 354 A1 8/2007
(Continued)

OTHER PUBLICATIONS

Extended European Search Report dated Dec. 2, 2019, in Patent Application No. 19189217.3, 8 pages.
(Continued)

*Primary Examiner* — Ernesto A Suarez
*Assistant Examiner* — James J Taylor, II
(74) *Attorney, Agent, or Firm* — Oblon, McClelland, Maier & Neustadt, L.L.P.

(57) ABSTRACT

A parking lock module has a housing, in which, for the actuation of a parking lock, a positioning member is movable between a locking position and an unlocking position. The positioning member is selectively fixable in a position relative to the housing with an arresting device, which has a detent element interacting with the positioning member. The detent element is movable with an actuator between arresting and release positions. A sensor arrangement with a position detector, which is positionally fixed relative to the housing, and a position encoder, which, for the detection of the respective position, is operatively connected to the positioning member or to the detent element. The electromagnetic actuator is activatable with a circuit board attached to the housing and bears the position detector of the sensor arrangement.

13 Claims, 5 Drawing Sheets

(56) References Cited

U.S. PATENT DOCUMENTS

| | | | |
|---|---|---|---|
| 9,234,581 B2* | 1/2016 | Nagahori | F16H 61/0006 |
| 2007/0191182 A1 | 8/2007 | Koski et al. | |
| 2018/0022201 A1* | 1/2018 | Samila | F16D 27/118 |
| | | | 192/46 |
| 2018/0154881 A1 | 6/2018 | Heubner et al. | |
| 2019/0136974 A1* | 5/2019 | Li | F16H 63/3466 |
| 2019/0271395 A1* | 9/2019 | Schwegler | F16H 63/483 |
| 2019/0338853 A1* | 11/2019 | Boralkar | H02K 11/21 |

FOREIGN PATENT DOCUMENTS

| | | | |
|---|---|---|---|
| DE | 10 2006 022 963 A1 | 11/2007 | |
| DE | 102009018122 A1 * | 10/2010 | F16H 63/3475 |
| DE | 10 2011 105 068 A1 | 7/2012 | |
| DE | 10 2015 008 709 A1 | 1/2016 | |
| DE | 102015006323 A1 * | 11/2016 | F16H 63/3483 |
| DE | 10 2016 014 523 A1 | 6/2018 | |
| EP | 1 602 544 A1 | 12/2005 | |

OTHER PUBLICATIONS

German Search Report dated Nov. 18, 2020 in German Patent Application No. 10 2018 006 098.6 (with English translation of Category of Cited Documents), 9 pages.

* cited by examiner

PARKING LOCK MODULE FOR ACTUATING A PARKING LOCK IN A MOTOR VEHICLE

TECHNICAL FIELD

The invention relates to a parking lock module for actuating a parking lock in a motor vehicle, as per the preamble of patent claim 1. In particular, the invention relates to a parking lock module such as has recently found widespread use in the automotive industry in motor vehicles with hybrid transmissions and modern transmissions with an automatic nature (automated manual transmissions).

PRIOR ART

Parking locks are required in particular when a self-locking action of the drive (engine) cannot be utilized to hold the motor vehicle stationary. Locking of the drive train is then generally realized by means of a parking lock wheel which is arranged rotationally conjointly on an output shaft of the transmission and which has a toothing and which, by means of a parking lock pawl mounted pivotably on a parallel axle, can be locked in form-fitting fashion at the toothing, wherein the parking lock pawl must be pivoted counter to the force of a restoring spring which preloads the parking lock pawl away from the parking lock wheel into an unlocked position.

For this purpose, aside from electrically actuated parking lock actuators, use may also be made of electrohydraulically or hydraulically actuated parking lock actuators, which serve for generating a linear movement by means of which an actuating element, for example in the form of a cam or of a cone, can be moved against the parking lock pawl in order to pivot the latter. To ensure that the parking lock prevents the motor vehicle from rolling away even if the parking lock pawl, during the actuation process, abuts against a tooth of the parking lock wheel without engaging in form-fitting fashion with the toothing, it is furthermore possible for an energy store (advancing spring) to be provided on the actuating element, which energy store, in the event of the motor vehicle rolling, advances the parking lock pawl via the actuating element such that said parking lock pawl enters into engagement with the toothing of the parking lock wheel. Furthermore, in general, it must be ensured that the actuating element, in its respective actuation position relative to the parking lock pawl—holding the parking lock pawl that has been pivoted into engagement with the parking lock wheel, or releasing the parking lock pawl—is arrested without application of energy (electrical current or pressure), and an emergency actuation is possible which permits an engagement of the parking lock in the event of a failure of the actuator.

In the prior art, there is no lack of proposals for realizing these functions in a manner integrated in a parking lock module for actuating a parking lock in a motor vehicle. One such parking lock module is disclosed for example by the document DE 10 2015 008 709 A1, which forms the preamble of Patent claim 1. According to this prior art, the parking lock module has pressure chamber housing in which a positioning member in the form of a piston element, as a constituent part of an actuating mechanism, is accommodated. An actuating member in the form of a shift rod is articulated on the piston element. The piston element, which is longitudinally displaceable along a displacement axis of the pressure chamber housing, is, in a parking lock engagement direction, preloaded by means of a piston spring with a spring force into a locking position, in which said piston element can be selectively fixed relative to the pressure chamber housing by means of a detent unit. Furthermore, the piston element can be subjected to pressure loading in a parking lock disengagement direction, which is opposite to the parking lock engagement direction, by means of a hydraulic pressure chamber in the pressure chamber housing in order, when the detent unit is released, to assume an unlocking position counter to the spring force of the piston spring, in which unlocking position the piston element is in turn selectively fixable relative to the pressure chamber housing by means of the detent unit.

Here, an actuating cone is arranged in axially displaceable fashion on the shift rod, more specifically on that end thereof which is averted from the piston element, which actuating cone is, by means of a spring element, preloaded relative to the shift rod in the parking lock engagement direction against a stop provided on the shift rod. In the event of a movement of the piston element into the unlocking position, the actuating cone can thus be moved by means of the stop in the parking lock disengagement direction. The actuating cone has an actuating bevel which can be placed in contact with a cone guide element which is fixed with respect to the pressure chamber housing and which is in the form of a metallic support plate, such that, in the event of a longitudinal movement, effected by means of the piston element, of the shift rod in the parking lock engagement direction, the actuating bevel is supported on an alignment bevel of the support plate and, here, deflecting the shift rod relative to the piston element, causes a movement of the actuating cone in a transverse direction in order to actuate the parking lock, that is to say the locking element (parking lock pawl) thereof.

In the case of this prior art (see FIGS. 3 and 4 of document DE 10 2015 008 709 A1), the abovementioned detent unit comprises, as detent element, firstly a detent lever which is accommodated in a housing cutout formed transversely with respect to the displacement axis of the piston element in the pressure chamber housing, and which, there, is pivotable about a pivot axis which runs parallel to the displacement axis of the piston element. In order to fix the piston element in its locking position or its unlocking position relative to the pressure chamber housing, the detent lever may be placed in positive locking engagement with a detent contour provided on the piston element (locking state).

The detent lever is switchable passively into its locking state and actively into its unlocking state, in which it is out of engagement with the detent contour on the piston element. For the (passive) setting of the locking state, the detent unit has a restoring spring which engages, with a spacing to the pivot axis, on a projection of the detent lever in order to pivot the detent lever into, and hold it in, its locking state.

By contrast, for the (active) setting of the unlocking state, the known detent unit has an actuator arrangement which serves for pivoting the detent lever counter to a spring force of the restoring spring into its unlocking state. Said actuator arrangement is of redundant design and comprises a hydraulic actuator and an electromagnetic actuator, which can individually or jointly pivot the detent lever into its unlocking state and thereby enable the displacement of the piston element. The hydraulic actuator has a small cylindrical piston which is hydraulically pressurizable at a circular effective surface via a (further) pressure chamber formed in the pressure chamber housing. The small piston engages on an extension of the detent lever, which extension is formed on the detent lever on a side situated opposite the projection for the restoring spring. By contrast, the electromagnetic actuator has a solenoid which is flange-mounted on the pressure chamber housing and which has an armature which has a pin-like end. The pin-like end is displaceable along a feed axis which intersects the displacement axis of the piston element, and said pin-like end engages on an arm of the detent lever, which arm is formed on the detent lever between the projection for the restoring spring and the extension for the engagement of the hydraulic actuator.

In the case of this prior art, it is ultimately possible for the respective position of the piston element relative to the pressure chamber housing to be acquired by means of a sensor arrangement which has a travel sensor positionally fixed relative to the pressure chamber housing and has, outside the pressure chamber housing, a permanent magnet which is coupled axially fixedly to the piston element by means of a magnet holder in order to follow a movement of the piston element in a manner acquirable by means of the travel sensor. An actuation state of the parking lock module can thus be acquired.

In the case of this prior art, both the solenoid of the electromagnetic actuator of the detent and the travel sensor of the sensor arrangement must be electrically contacted. Details in this regard however do not emerge from the document DE 10 2015 008 709 A1. Furthermore, in the case of this prior art, the travel sensor must be installed in the motor vehicle transmission separately from, and in a defined position relative to, the parking lock module. Normally, during or after the separate installation of parking lock module and travel sensor in or on the transmission housing, separate cables are connected to the solenoid of the detent unit and to the travel sensor. The overall effort involved in this installation and contacting is clearly not inconsiderable, in particular in the case of restricted space conditions in or on the transmission housing.

PROBLEM

The problem addressed by the invention is that of providing an electrically triggerable parking lock module of the simplest possible design for actuating a parking lock in a motor vehicle, which parking lock module is equipped with a sensor system, the installation and contacting of which only requires the least possible effort.

PRESENTATION OF THE INVENTION

Said problem is solved by means of a parking lock module for actuating a parking lock in a motor vehicle having the features of Patent claim 1. The subclaims relate to advantageous embodiments of the invention.

In the case of a parking lock module for actuating a parking lock in a motor vehicle, which parking lock module has a housing, in which a positioning member for the actuation of the parking lock is movable between a locking position and an unlocking position and is selectively fixable in at least one of these positions relative to the housing by means of an arresting device, which arresting device has a detent element which interacts with the positioning member for this purpose, which detent element is movable at least by means of an electromagnetic actuator between an arresting position and a release position, wherein a sensor arrangement is provided which has at least one position detector, which is positionally fixed relative to the housing, and at least one position encoder, which, for the detection of the respective position, is operatively connected to the positioning member or to the detent element, according to the invention the electromagnetic actuator of the arresting device is activatable by means of a circuit board which is attached to the housing and which also bears the position detector of the sensor arrangement.

One component thus advantageously performs two major functions on the parking lock module: firstly, the circuit board integrated in or on the parking lock module serves as a stable electrical path via which the electromagnetic actuator of the arresting device can be activated. Secondly, the circuit board, owing to its inherent stiffness, forms a mechanical carrier, fixed with respect to the housing, for the position detector of the sensor arrangement.

Here, by means of the circuit board, the position detector is advantageously fixedly aligned and positioned relative to the housing and relative to the positioning member and detent element, movable in said housing, for the purposes of an exact detection of the movements of the positioning member and detent element effected in the parking module. This (pre-)alignment and (pre-)positioning is then not changed again during the installation of the parking lock module in the motor vehicle.

The positioning, alignment and fastening of a single position detector of the sensor arrangement assigned to the parking lock module in the transmission housing, and the separate cabling of said position detector, such as are conventional in the prior art, can advantageously be omitted.

Aside from this considerable simplification of the functionally compatible installation and contacting, a further advantage of the design according to the invention of the parking lock module consists in that the parking lock module can, without great effort, be electrically pre-tested and, if appropriate, pre-programmed already before being fitted in the motor vehicle.

The circuit board may basically be flange-mounted, clipped or screwed onto the housing of the parking lock module from the outside in order for the circuit board to be fastened to the parking lock module. It is however particularly preferable if the housing of the parking lock module is equipped with a cutout for receiving the circuit board, which cutout offers particular protection for the position detector, carried by the circuit board, of the sensor arrangement and for the circuit board itself, and thus for the contacting of the electromagnetic actuator of the arresting device.

The cutout for receiving the circuit board may basically have any desired orientation relative to the housing of the parking lock module, as long as the circuit board accommodated herein can perform the contacting and carrier functions for which it is intended. In a particularly preferred embodiment, the cutout for receiving the circuit board however extends longitudinally with respect to the positioning member, which is advantageous in particular with regard to a small structural space requirement.

If, furthermore, the electromagnetic actuator of the arresting device has an armature which is operatively connected to the detent element and which is displaceable along a feed axis, then the circuit board is preferably oriented transversely with respect to the feed axis, which, in relation to other conceivable alignments, simplifies in particular the contacting of the electromagnetic actuator with the circuit board.

The electromagnetic actuator of the arresting device may preferably be contacted with the circuit board by means of contact pins which are fixed in the circuit board by means of a press-fit connection. Although it is basically also possible for a soldered connection to be provided for electrically connecting the electromagnetic actuator to the circuit board, the press-fit connection is however quicker and cheaper to produce in a mass production context.

In order that, in particular, even (at least partially) automated assembly can be used for this purpose with high process reliability, it is furthermore preferable if the contact pins of the electromagnetic actuator of the arresting device are held by means of a guide part in a slot of the housing of the parking lock module, which slot runs transversely with respect to the cutout for receiving the circuit board. Here, the guide part advantageously ensures stabilization of the contact pins against inadvertent bending or buckling.

With regard to the highest possible degree of integration of functions in the parking lock module, a design is furthermore advantageous in which, in the parking lock module, there are also integrated activation electronics for the position detector of the sensor arrangement, which activation electronics are arranged and connected on the circuit board. It is thus possible in particular in a simple manner for the parking lock module to (also) be pre-tested with its electrical functions before its final installation in the motor vehicle. As an alternative, which is less preferred in relation thereto, it is however also conceivable for the activation electronics for the position detector to be provided externally with respect to the parking lock module.

It is particularly advantageous if the position detector of the sensor arrangement is connected via the circuit board to an electrical interface which is integrated in the parking lock module. During the installation of the parking lock module in the motor vehicle, it is then merely necessary for a superordinate controller (normally the transmission controller), which is arranged separately from the parking lock module at a location in the motor vehicle which is particularly well-protected against environmental influences such as moisture, temperature and operating media, to be connected to the electrical interface of the parking lock module.

Here, provision may be made in particular whereby the electromagnetic actuator of the arresting device and the position detector of the sensor arrangement are jointly contactable via the electrical interface, which yet further minimizes the outlay in terms of connection and cabling as well as the number of components that are required overall for the contacting of the electromagnetic actuator of the arresting device and of the position detector of the sensor arrangement.

In a preferred embodiment, the electrical interface furthermore has a plug connector which is attached to the housing of the parking lock module. Thus, during the final installation of the parking lock module in the motor vehicle, one simple manual operation is sufficient to electrically contact (at least) the position detector of the sensor arrangement of the parking lock module, specifically an insertion of the counterpart on the motor vehicle into the plug connector of the parking lock module. As an alternative to this, other types of connection are however likewise conceivable, for example a screw connection or bayonet connection, although these are also less preferred with regard to the slightly greater effort involved in the contacting.

Here, the plug connector may basically have any desired orientation with respect to the housing of the parking lock module. In particular with regard to particularly easy and straightforward contacting, owing to good accessibility, during the final installation of the parking lock module in the motor vehicle, an embodiment is however preferable in which the plug connector is oriented substantially transversely with respect to a displacement axis of the positioning member, along which displacement axis the positioning member is longitudinally displaceable in the housing of the parking lock module.

It is furthermore preferable if the cutout for receiving the circuit board is closed off by means of a cover on which the plug connector is formed. Firstly, in this way, in relation to an open design of the cutout, the circuit board received in the cutout can be mechanically better protected, wherein the cutout can also be easily sealed off to the outside by means of the cover. Secondly, by arrangement of the plug connector on the cover, in particular the connecting paths between the plug connector and the circuit board are advantageously short.

Here, the cover may be connected to the housing of the parking lock module for example by means of a clip connection or screws, possibly with the cooperation of a sealing element. With regard to a design which is particularly simple and inexpensive in terms of mass production, and a sealing action of the connection which can be achieved without further measures, an embodiment is however preferable in which the (plastics) cover is laser-welded to the (plastics) housing of the parking lock module. Other plastics welding methods, such as for example ultrasound or punch welding, may however also be used for the fastening of the cover to the housing of the parking lock module.

Likewise preferred with regard to simple and inexpensive installation is an embodiment of the parking lock module in which the plug connector of the electrical interface is, for the joint contacting of the electromagnetic actuator of the arresting device and of the position detector of the sensor arrangement, equipped with contact pins which are fixed in the circuit board by means of a press-fit connection. As an alternative to this, a soldered connection would likewise be conceivable, though this is less preferred as it involves greater outlay.

Finally, as regards the operative connection of the position encoder to the positioning member, the position encoder may for example be installed indirectly on the positioning member by means of a holder. In particular with regard to the least possible installation effort, a small number of parts and a minimum structural space requirement, an embodiment of the parking lock module is however preferable in which the position encoder is attached directly to the positioning member, wherein the positioning member is formed preferably from a plastic, in which the position encoder is embedded by encapsulation with the plastic.

BRIEF DESCRIPTION OF THE DRAWINGS

The invention will be discussed in more detail below on the basis of a preferred exemplary embodiment with reference to the appended, partially schematic drawings, in which.

Figure 1:
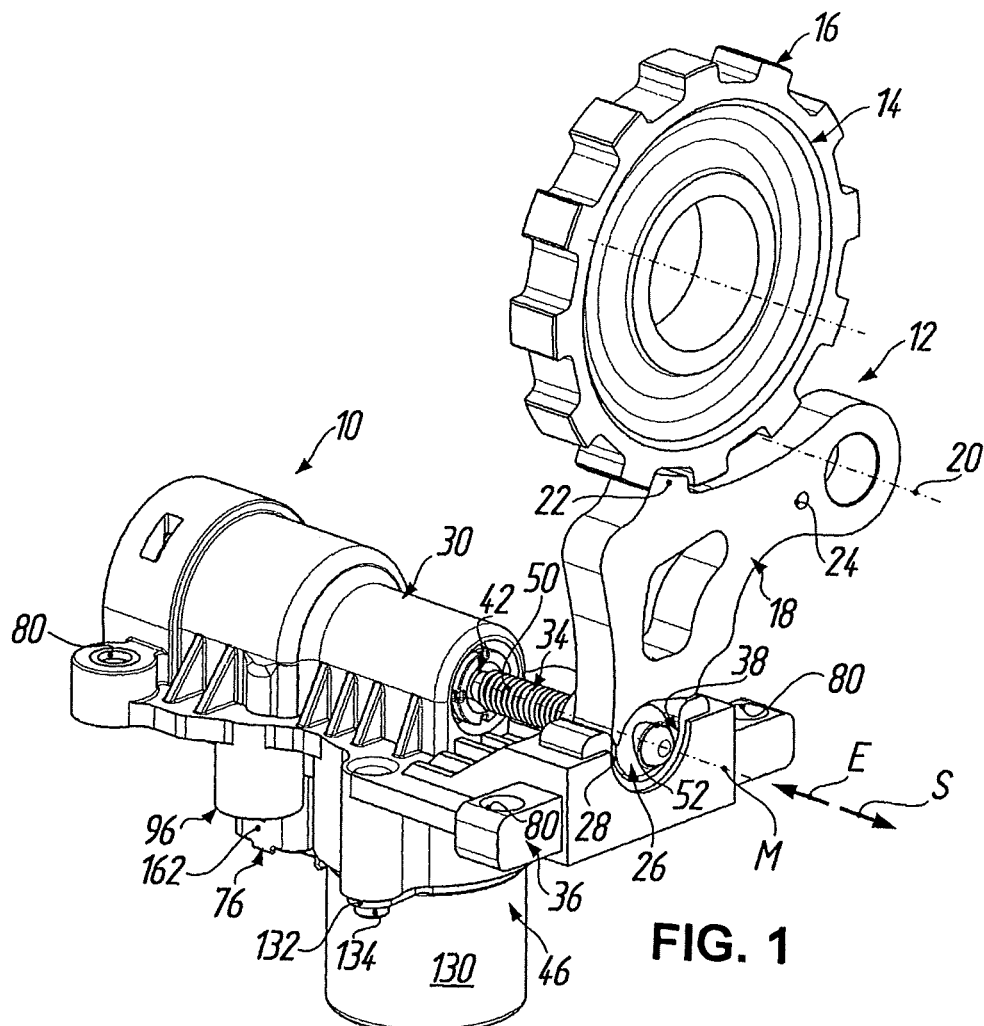
FIG. 1 shows a perspective view of a parking lock module according to the invention in its use position on a parking lock (only schematically shown here), with a pawl and a parking lock wheel, obliquely from above/front left.
Figure 2:
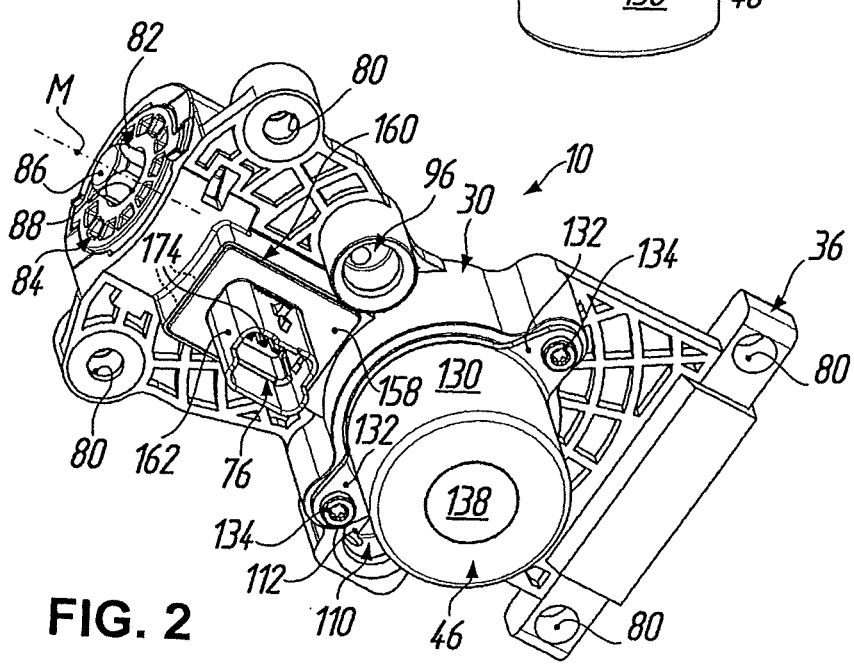
FIG. 2 shows a perspective view of the parking lock module as per FIG. 1 obliquely from below/rear left, without the elements of the parking lock.

In the drawings, elastic or elastomer components, specifically the dynamic seals, are shown in the non-deformed state in order to simplify the illustration; in reality, these deformable components bear against the adjacent surfaces of adjoining components.

DETAILED DESCRIPTION OF THE EXEMPLARY EMBODIMENT

Figure 3:
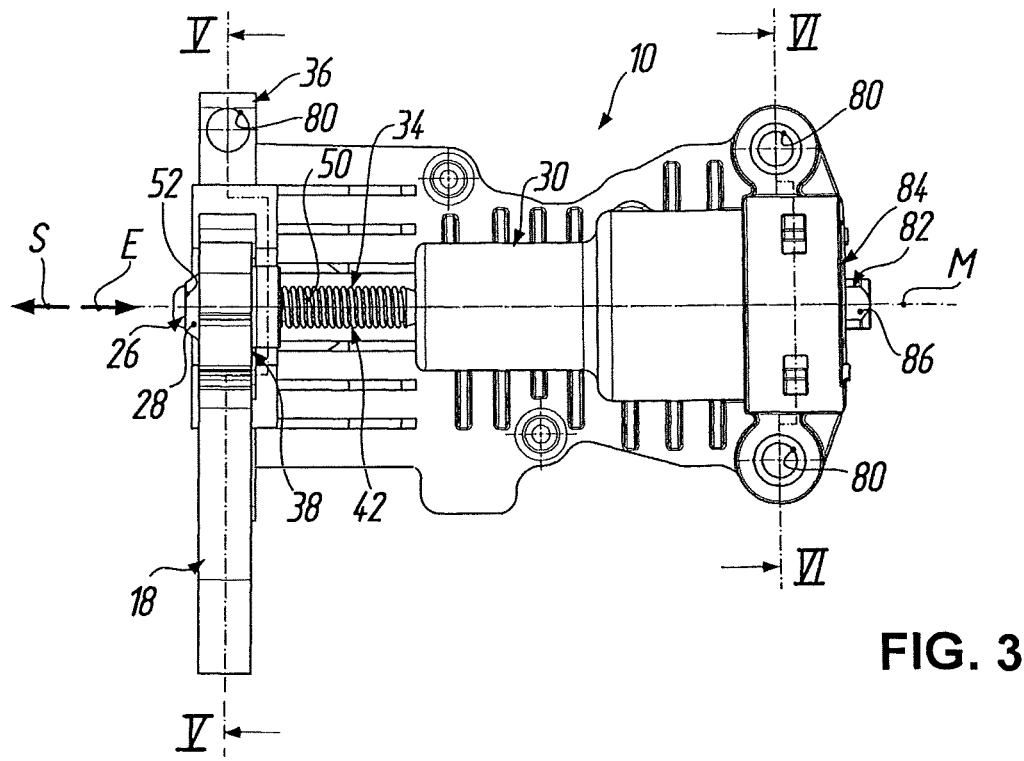
FIG. 3 shows a plan view of the parking lock module as per FIG. 1 from above in FIG. 1, with a pawl.
Figure 4:
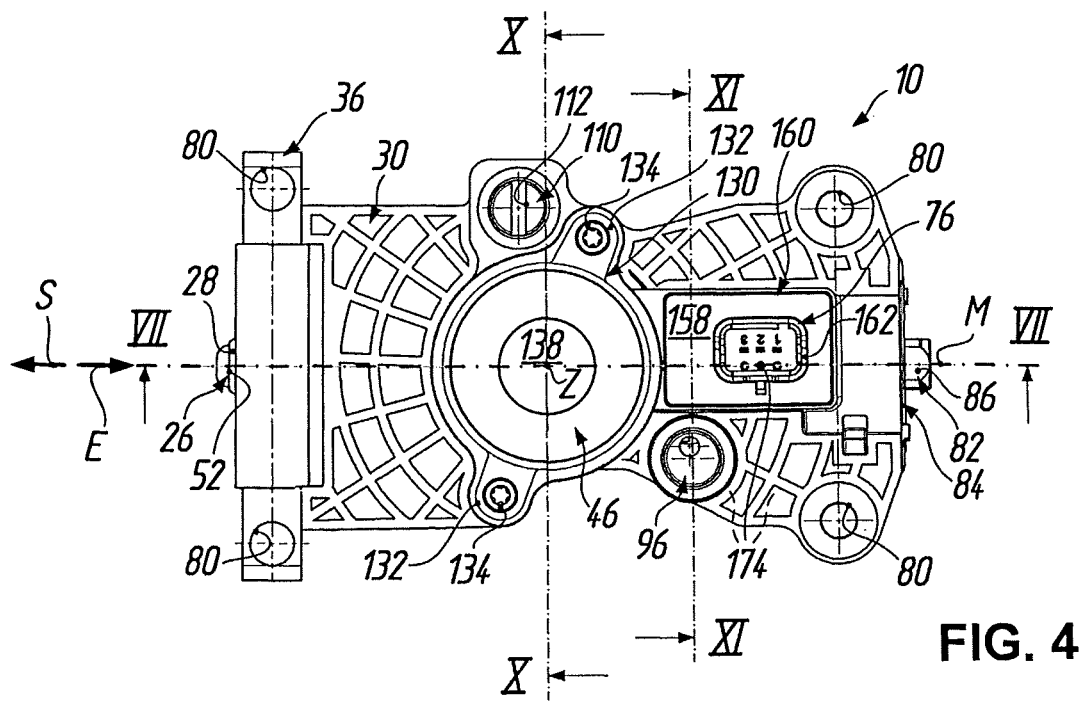
FIG. 4 shows a view from below of the parking lock module as per FIG. 1 from below in FIG. 1, again without the elements of the parking lock.
Figure 5:
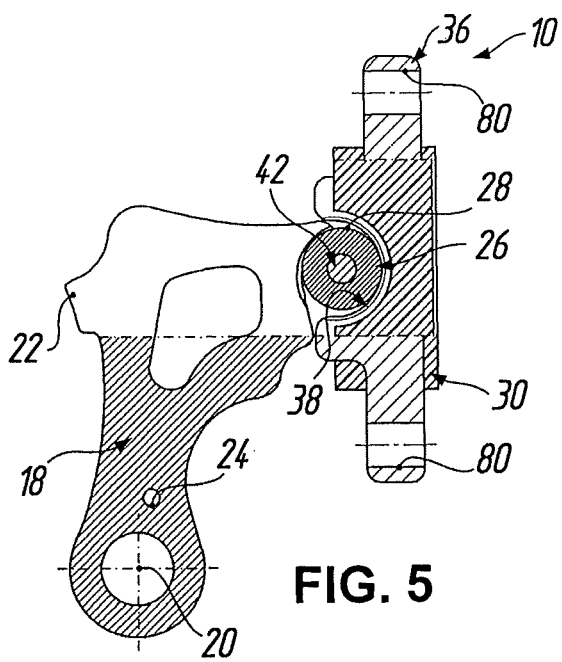
FIG. 5 shows a sectional view of the parking lock module as per FIG. 1 in accordance with the offset section profile line V-V in FIG. 3, likewise with a pawl.
Figure 6:
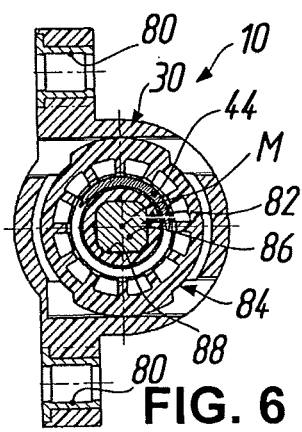
FIG. 6 shows a sectional view of the parking lock module as per FIG. 1 in accordance with the offset section profile line VI-VI in FIG. 3.

In the figures, the reference designation 10 is used generally to denote a parking lock module for actuating a parking lock 12 in a motor vehicle. As per FIG. 1, the parking lock 12 has, in a manner known per se, a parking lock wheel 14 which is arranged rotationally conjointly and axially fixedly on a transmission shaft (not illustrated) of a motor vehicle transmission and which has, on the outer circumference, a toothing 16. For the arresting of the drive train of the motor vehicle with form-fitting action, the parking lock 12 furthermore has a pawl 18 (shown only in FIGS. 1, 3 and 5) which is articulated on a transmission housing (not shown here) so as to be pivotable about a pivot axis 20. The pawl 18 has a locking tooth 22 which, during a pivoting of the pawl 18 about the pivot axis 20, can engage in form-fitting fashion with the toothing 16 of the parking lock wheel 14. The reference designation 24 indicates a bore in the pawl 18, which is engaged on by a restoring spring (not shown here) which is supported relative to the transmission housing and which preloads the pawl 18 away from the parking lock wheel 14 about the pivot axis 20 into an unlocked position.

Figure 7:
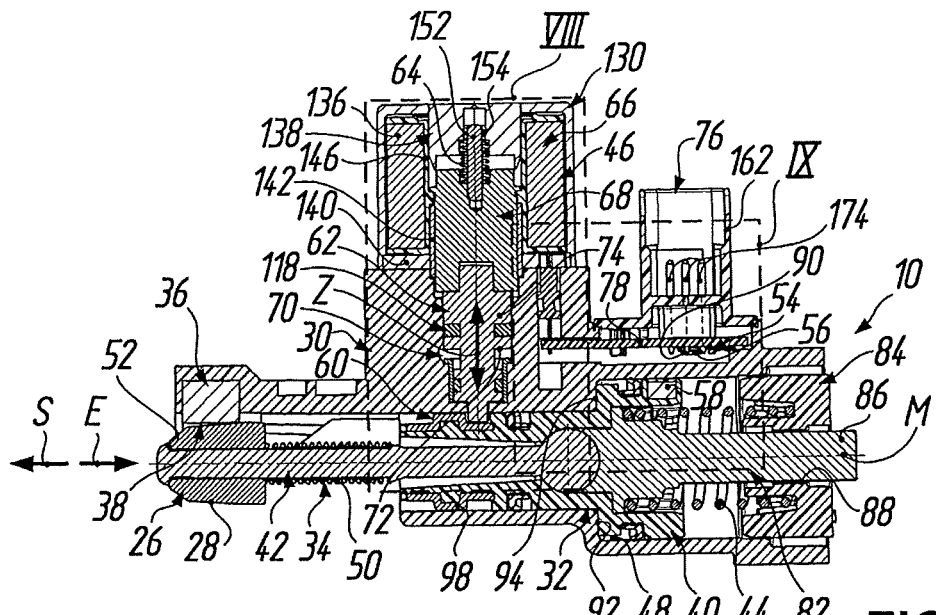
FIG. 7 shows a sectional view of the parking lock module as per FIG. 1 in accordance with the section profile line VII-VII in FIG. 4.

For the pivoting of the pawl 18 about the pivot axis 20, an actuating element 26 is provided on the parking lock module 10, which actuating element, in the exemplary embodiment illustrated, has a (doubly) conical surface portion 28 as per FIG. 7. The actuating element 26 is, in a manner yet to be described in more detail, axially displaceable selectively in a locking direction S or an unlocking direction E, as indicated by arrows in FIGS. 1, 3, 4 and 7 to 9, by means of an actuating mechanism 32 (see FIG. 7), which is accommodated in a housing 30 of the parking lock module 10, via an actuating member 34 which is articulatedly connected to the actuating mechanism 32. Here, the conical surface portion 28 of the actuating element 26 is, as per FIG. 1, supported on a conical guide element, which is fixed with respect to the housing, in the form of a metallic support plate 36, which for this purpose has a support portion 38.

Thus, during an axial movement of the actuating element 26 in the locking direction S, the pawl 18 in FIG. 1 is lifted, rotationally about the pivot axis 20, counter to the force of the restoring spring (not illustrated) in order to bring the locking tooth 22 into form-fitting engagement with the toothing 16 of the parking lock wheel 14. By contrast, in the event of an axial movement of the actuating element 26 in the unlocking direction E, the conical surface portion 28 of the actuating element 26 is pulled away out of its position between pawl 18 and support plate 36. This has the result that the pawl 18 in FIG. 1 is lowered, rotationally about the pivot axis 20, owing to the force of the restoring spring, wherein the locking tooth 22 disengages from the toothing 16 of the parking lock wheel 14.

In the exemplary embodiment illustrated, the housing 30 is—along with further parts of the parking lock module 10—formed from a plastics material, wherein the metallic support plate 36 is integrated in the housing 30 such that the support portion of the support plate 36 for contact with the actuating element 26 projects beyond the plastics material of the housing (see in particular FIGS. 1 and 5), as is described in detail in the earlier German patent application DE 10 2018 003 752.6 from the same applicant, to which reference is expressly made at this juncture with regard to further details in this respect.

With regard to further details of the actuating mechanism 32, reference is made firstly in particular to FIG. 7. According to said figure, the actuating mechanism 32 has a piston 40, which piston is received in the housing 30 of the parking lock module 10 so as to be longitudinally displaceable along a central axis M which forms a displacement axis, and which piston is operatively connected to a piston rod 42 of the actuating member 34. The piston 40 is, in the locking direction S, preloaded by means of a piston spring 44 with a spring force into a locking position (shown in FIGS. 7 to 9) in which said piston can be selectively fixed relative to the housing 30 by means of an arresting device 46 which will be discussed in more detail below. Furthermore, the piston 40 can be pressurized in the unlocking direction E, which is opposite to the locking direction S, via a pressure chamber 48 provided in the housing 30, in order, when the arresting device 46 is released, to assume an unlocking position counter to the spring force of the piston spring 44, in which unlocking position the piston 40 can in turn be fixed relative to the housing 30 by means of the arresting device 46. Accordingly, the piston 40 can be moved from the locking position into the unlocking position and vice versa, and fixed in the respective position, in a manner dependent on the state of actuation of the arresting device 46.

The actuating element 26 arranged axially displaceably on the piston rod 42 is furthermore, by means of a piston rod spring (advancing spring), preloaded relative to the piston rod 42 in the locking direction S against a stop 52 provided on the piston rod 42. The piston rod spring 50 in the form of a helical compression spring serves as an energy store for the event that the pawl 18, during an actuation by the parking lock module 10, comes to bear with its locking tooth 22 against a tooth of the parking lock wheel 14 without engaging in form-fitting fashion with the toothing 16. In such a situation, the piston rod spring 50 ensures that the spring-preloaded actuating element 26 advances the pawl 18 as the motor vehicle rolls, such that the locking tooth 22 of said pawl 18 engages with the toothing 16 of the parking lock wheel 14. In the opposite direction, the actuating element 26 can, with a movement of the piston 40 in the unlocking position, be moved, that is to say pulled, by means of the stop 52 in the unlocking direction E.

The respective axial position of the piston 40 in the housing can in this case be acquired by means of a sensor arrangement 54 (likewise described in yet more detail below) which, as per Figure is 7 and 9, generally has a position detector 56, which is positionally fixed relative to the housing 30, and a position encoder 58, which is operatively connected to the piston 40. By means of the sensor arrangement 54, it is thus possible firstly for the respective state of actuation of the parking lock module 10 to be acquired, that is to say whether the piston 40 of the actuating mechanism 32 is situated in the locking position as per FIG. 7 or in the unlocking position. Secondly, damage to the parking lock module 10, for example a possible breakage of the piston spring 44, can be detected. Furthermore, it is however also possible for the engagement and disengagement of the parking lock 12 to be controlled, specifically through acquisition of the stroke of the piston 40 and pressurization of the pressure chamber 48 in a manner dependent on this. It is likewise possible for "ratcheting" of the pawl 18 over the toothing 16 of the parking lock wheel 14 to be detected, which can be counteracted through pressurization of the pressure chamber 48.

Figure 10:
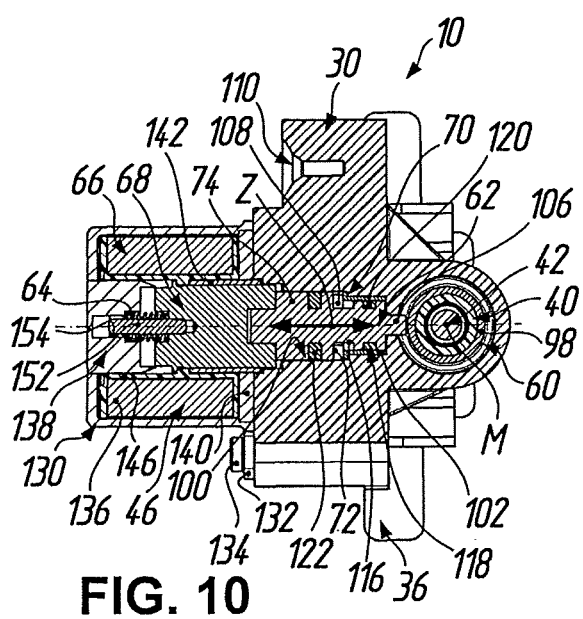
FIG. 10 shows a sectional view of the parking lock module as per FIG. 1 in accordance with the section profile line X-X in FIG. 4.
Figure 8:
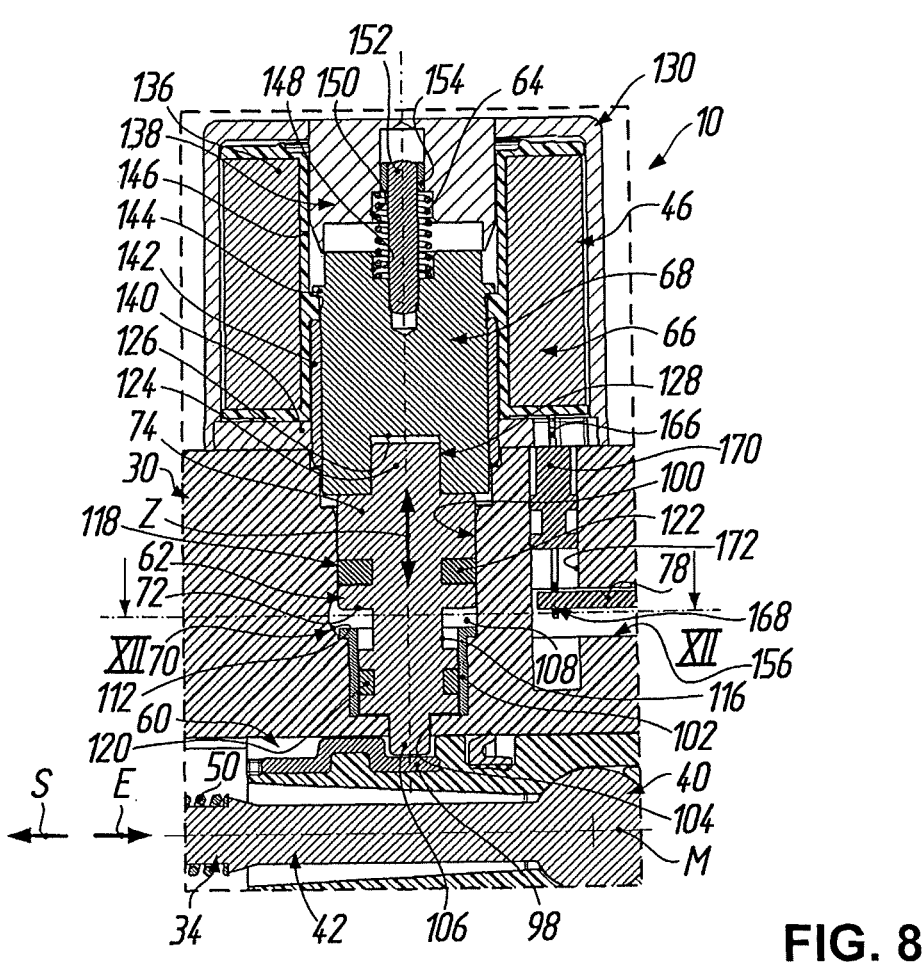
FIG. 8 shows a sectional view, cut away on all sides and on an enlarged scale, of the parking lock module as per FIG. 1 in accordance with the detail VIII in FIG. 7.

The arresting device 46 for the selective fixing of the piston 40 relative to the housing 30 generally comprises, as per in particular FIGS. 7, 8 and 10, a detent contour 60, which is fixed with respect to the positioning member, that is to say piston, and a detent element 62, which interacts with said detent contour and is provided on the housing. The detent contour 60 has detent portions for defining the locking position and the unlocking position of the piston 40. The detent element 62 is movable from an arresting position shown in the stated figures, in which said detent element is in engagement with the detent contour 60, into a release position, in which said detent element releases the detent contour 60, and vice versa. Here, the detent element 62 is passively preloaded into the arresting position by means of a spring 64. Counter to the preload of the spring 64, the detent element 62 can be actively moved into the release position by means of an electromagnetic actuator 66, which has an armature 68 which is displaceable along a feed axis Z, and/or by means of a fluidic actuator 70, which has a pressurizable effective surface 72. In the exemplary embodiment illustrated, the actuating arrangement for implementing the release position of the detent element 62 is thus formed with duplex redundancy.

Figure 11:
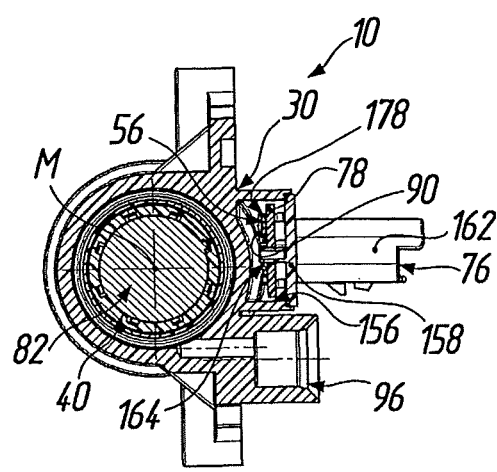
FIG. 11 shows a sectional view of the parking lock module as per FIG. 1 in accordance with the section profile line XI-XI in FIG. 4.

As will be discussed in detail below, the parking lock module 10 according to the embodiment illustrated has special features in relation to the prior art discussed in the introduction in particular with regard to the following five aspects (i to v): firstly, (i) the detent element 62 is guided displaceably along the feed axis Z, wherein, in a very compact embodiment of the parking lock module 10, the armature 68 of the electromagnetic actuator 66 and the pressurizable effective surface 72 of the fluidic actuator 70 are arranged coaxially with respect to the feed axis Z (see in particular FIG. 8). Furthermore, (ii) the spring 64 for preloading the detent element 62 is integrated in the electromagnetic actuator 66 of the arresting device 46 (see again FIGS. 7, 8 and 10), which is likewise beneficial for a small structural space requirement of the parking lock module 10. The same applies for the further special feature that (iii) the detent element 62 is itself formed as a piston 74, which is guided displaceably along the feed axis Z and which forms the pressurizable effective surface 72 of the fluidic actuator 70 (see in particular FIG. 8), wherein it is also the case that parts are omitted in relation to the prior art described further above. Furthermore, considering also the sensor system (sensor arrangement 54), provision is advantageously made whereby (iv) the electromagnetic actuator 66 of the arresting device 46 and the position detector 56 of the sensor arrangement 54 can be jointly contacted via an electrical interface 76 which is integrated in the parking lock module 10 (see in particular FIGS. 2, 4, 7 and 9), which, in relation to the prior art, considerably reduces the installation and contacting effort associated with the sensor system. Finally, this applies correspondingly to the special feature whereby (v) the electromagnetic actuator 66 of the arresting device 46 is activatable by means of a circuit board 78 attached to the housing 30 of the parking lock module 10, which circuit board also bears the position detector 56 of the sensor arrangement 54, as can be seen most clearly in FIGS. 9 and 11.

As regards the fastening of the parking lock module 10 in the motor vehicle, both the support plate 36 and the housing 30 are equipped with fastening holes 80, which are formed as parallel passage bores in the support plate 36 and as metallically lined passage holes in the housing 30, at locations of the support plate 36 and housing 30 which are spaced apart from one another to the greatest possible extent, as can be seen most clearly in FIGS. 2 to 6. In the installed state of the parking lock module 10, headed screws which are not illustrated in the figures extend through the fastening holes 80 and are screwed into associated threaded holes of the transmission housing (not shown) in order to position the parking lock module 10 relative to the transmission housing and pull said parking lock module firmly against the transmission housing.

The actuating mechanism 32 accommodated in the interior of the housing 30, and the attachment thereof to the actuating member 34, are described in detail in the earlier German patent application DE 10 2018 003 749.6 from the same applicant, to which reference is expressly made at this juncture with regard to further details in this respect. The parking lock module 10 according to the present exemplary embodiment has only few differences in relation thereto, as will be described briefly below.

One conspicuous difference in the case of the present exemplary embodiment consists firstly in that a thrust piece 82, via which the piston spring 44 engages on the piston 40 and which, by means of the piston spring 44, can be displaced relative to the piston 40 in the unlocking direction E counter to the spring force of the piston spring 44, is guided directly in a guide bushing 84 which closes off the housing 30 to the right in FIG. 7. Here, the guidance is realized with rotation prevention action by means of a guide extension 86 with a substantially square cross section (see FIG. 6), which engages through an opening 88 of complementary shape in the guide bushing 84.

Furthermore, a conspicuous difference in relation to the earlier design consists in that the position encoder 58 of the sensor arrangement 54 is, in the interior of the housing 30, attached directly to the positioning member, that is to say directly to the piston 40, which is in this case likewise formed as a plastics injection-moulded part. More specifically, it is also the case in the present exemplary embodiment that the sensor arrangement 54 is preferably a Hall sensor system, with a Hall element 90 as a constituent part of the position detector 56 (FIG. 9) fixed with respect to the housing, and with a magnet as position encoder 58, which is embedded in the piston 40 by encapsulation with the plastics material of the piston 40, that is to say is not seated outside the housing 30 and would not be connected by means of a holder to the piston 40.

As in the case of the previous design, the piston 40 is preloaded by means of the piston spring 44 against an annular stop surface 92 of the housing 30 in the locking position of the parking lock module 10 illustrated in FIG. 7. The counterpart surface 94 on the piston 40 is a constituent part of an annular effective surface which delimits the pressure chamber 48 and via which the piston 40 can be hydraulically acted on in the unlocking direction E. For the hydraulic loading of the pressure chamber 48 and thus of the piston 40, the housing 30 as per FIGS. 2, 4 and 11 has, on the underside, an integrally formed pressure port 96 which communicates with the pressure chamber 48 between housing 30 and piston 40 (see FIG. 11).

At the left-hand end in FIGS. 7 and 8, the piston 40 is reinforced on the outer circumference, for an engagement of the arresting device 46, with a metallic collar sleeve 98 which is embedded in the plastics material of the piston 40. The collar sleeve 98 forms, on the outer circumference, the detent contour 60 which, by means of the arresting device 46, permits locking of the piston 40 relative to the housing 30 either in the locking position or in the unlocking position of the piston 40.

In particular, FIGS. 7, 8, 10 and 12 now show further details of the arresting device 46 which, in the exemplary embodiment illustrated, as already mentioned further above, has two mutually independently activatable unlocking mechanisms, specifically the electrically activatable unlocking mechanism (electromagnetic actuator 66 with the armature 68 which is displaceable along the feed axis Z) and the hydraulically activatable unlocking mechanism (fluidic actuator 70 with the pressurizable effective surface 72). Both unlocking mechanisms serve for moving the detent element 62 counter to the spring force of the spring 64 selectively from its detent position on the collar sleeve 98 of the piston 40, as shown in FIGS. 7, 8 and 10, into a detent-release position remote from the collar sleeve 98, which permits a movement of the piston 40 along the central axis M.

For the spatial relative position of the individual constituent parts of the arresting device 46 with respect to the feed axis Z of the armature 68 of the electromagnetic actuator 66 and the piston 40 of the actuating mechanism 32 and the displacement axis thereof (central axis M) in the housing 30, the following can firstly be generally stated when considering in particular FIG. 8: the feed axis Z of the armature 68 extends substantially transversely with respect to the displacement axis M of the piston 40 and intersects said displacement axis (see FIG. 10). The fluidic actuator 70 and the electromagnetic actuator 66 are arranged one behind the other on the feed axis Z. Here, the fluidic actuator 70 is, in relation to the piston 40, situated on the feed axis Z in front of the electromagnetic actuator 66. Furthermore, the detent element 62 and the spring 64 for preloading the detent element 62 are arranged coaxially with respect to the feed axis Z, which likewise applies to the armature 68 of the electromagnetic actuator 66 and the spring 64. More specifically, the spring 64 and the armature 68 are arranged one behind the other on the feed axis Z. Here, in relation to the piston 40, the armature 68 is situated on the feed axis Z in front of the spring 64. The armature 68 is thus situated between the detent element 62 and the spring 64.

Figure 12:
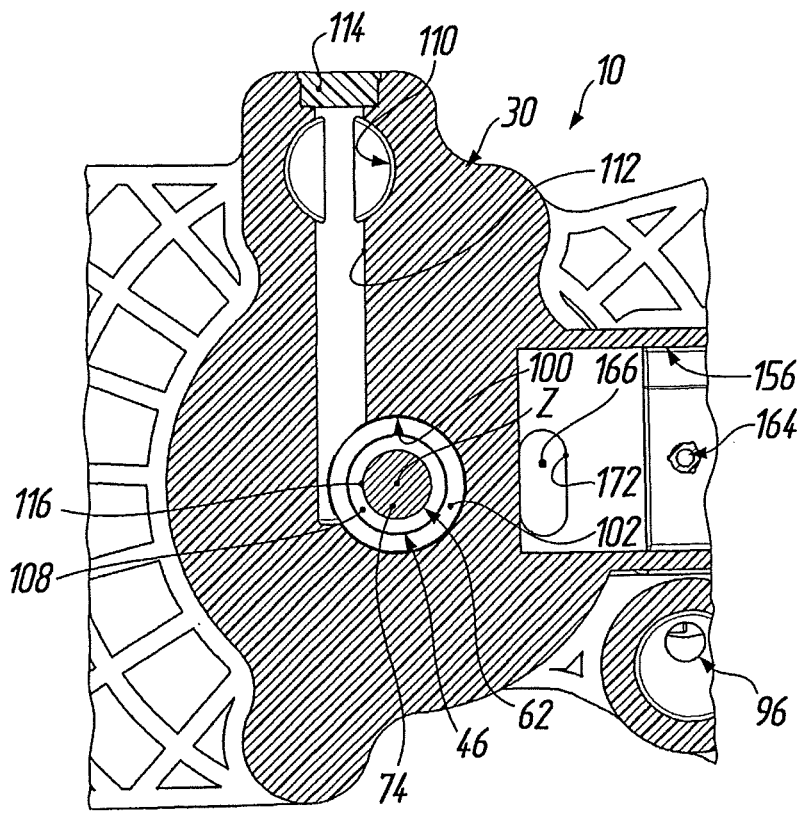
FIG. 12 shows a sectional view, cut away on all sides and on an enlarged scale, of the parking lock module as per FIG. 1 in accordance with the section profile line XII-XII in FIG. 8.

As shown in particular in FIG. 8, the housing 30 of the parking lock module 10 for accommodating the detent element 62, which, forming the pressurizable effective surface 72, is formed as a stepped piston 74 composed of metal, is equipped with a stepped cutout 100. The detent element 62 is guided in the cutout 100 of the housing 30, for which purpose a sub-region of the cutout 100 close to the piston 40 is lined with a metallic guide sleeve 102. The cutout 100 and the detent element 62 are in this case of rotationally symmetrical form about the feed axis Z, as can be seen in FIG. 12, in the same way as the guide sleeve 102. At the base of the cutout 100, the housing 30 is equipped with an aperture 104, which connects the cutout 100 to the interior of the housing 30, in which the piston 40 is accommodated in longitudinally displaceable fashion. The detent element 62 has a pin-like end 106 which can be placed in engagement with the detent contour 60 on the piston 40 and which, for this purpose, engages through the aperture 104, as illustrated in FIG. 8.

At the midpoint of the height of the cutout 100 in the housing 30, and thus at the height of the step of the piston 74, the detent element 62 and the cutout 100 delimit an annular pressure chamber 108, via which the effective surface 72 of the fluidic actuator 70 can be pressurized. For the hydraulic loading of the pressure chamber 108 and thus of the piston 74, the housing 30 in FIGS. 2 and 4 has, on the underside, a further pressure port 110 which is formed integrally on the housing 30 in a parallel arrangement with respect to the pressure port 96. The pressure port 110 communicates with the annular pressure space 108 via a connecting channel 112 which is formed in the housing 30 and which runs transversely with respect to the feed axis Z and with respect to the central axis M (see in particular FIGS. 4, 8 and 12). As can be seen most clearly in FIG. 12, the connecting channel 112, by means of its inner end, intersects the cutout 100 for receiving the detent element 62. At its other, outer end, the connecting channel 112 in FIG. 12 is closed off in sealed fashion with respect to the surroundings by means of a plastics plug 114, which is ultrasound-welded to the housing 30.

As per FIG. 8 in particular, for an improved impingement of flow on the hydraulic effective surface 72 of the piston 74, the detent element 62 is equipped, axially in the region of the annular pressure chamber 108, with a depression 116 which runs around the feed axis Z. FIGS. 8 and 10 furthermore show that the annular pressure chamber 108 is sealed off by means of a seal arrangement 118 between piston 74 and cutout 100. The seal arrangement 118 has, to both sides of the annular pressure chamber 108 as viewed along the feed axis Z, in each case one sealing element 120, 122. Here, the sealing elements 120, 122 are accommodated in respectively associated radial grooves of the piston 74, and protrude beyond these slightly in a radial direction in relation to the feed axis Z, in order to bear sealingly and in sliding fashion against the wall surface of the cutout 100, and simultaneously serve here as slide rings.

At its upper end in FIG. 8, the detent element 62 finally has a cylindrical extension 124, which is pressed into an end-side recess 126, which is of complementary shape, of the armature 68 of the electromagnetic actuator 66. Thus, the detent element 62 and the armature 68 are directly connected to one another, specifically by means of an interference fit at the reference designation 128 in FIG. 8.

It is clear to a person skilled in the art that, in the presence of sufficient hydraulic loading of the effective surface 72 of the piston 74 via the pressure port 110, the connecting channel 112 and the annular pressure chamber 108, the detent element 62 is lifted in the cutout 100 in FIG. 8, correspondingly to the double arrow Z, counter to the spring force of the spring 64 in the electromagnetic actuator 66. Here, the pin-like end 106 of the detent element 62 is retracted through the aperture 104 in the housing 30 and is released from the detent contour 60 on the collar sleeve 98 of the piston 40, such that the locking of the piston 40 is eliminated.

With regard to further details of the electromagnetic actuator 66, reference is made in particular to FIGS. 2, 4, 7, 8 and 10. Accordingly, the electromagnetic actuator 66 firstly has a substantially cup-shaped coil housing 130, which is flange-mounted from below on the housing 30 of the parking lock module 10. For this purpose, the coil housing 130 has in each case one flange lug 132 situated on diametrically opposite sides with respect to its central axis (feed axis Z). When the electromagnetic actuator 66 is in the fastening state on the housing 30 of the parking lock module 10, fastening screws 134 engage through the flange lugs 132 of the coil housing 130 and are screwed into threaded bushings (not shown in the figures) which are embedded in the plastics material of the housing 30.

In the coil housing 130, there is accommodated a coil 136, such as is known for solenoids, which interacts with the armature 68 and which surrounds the armature 68. The coil 136 is held in the coil housing 130 by means of a closure part 138 situated at the top in FIGS. 7 and 8 and an annular return-path plate 140 situated at the bottom in said figures. The closure part 138 and the return-path plate 140 are pressed into the coil housing 130 and ensure the required magnetic return path of the magnetic drive that is formed. Furthermore, a bushing 142 is pressed into the return-path plate 140, which bushing guides the substantially cylindrical armature 68. The bushing 142 protrudes slightly beyond the return-path plate 140, such that it can engage with centring action in the stepped cutout 100 of the housing 30, as shown in FIG. 8. An annular collar 144 formed close to the upper end of the armature 68 in FIG. 8 forms, with a counterpart surface on a plastics encapsulation 146 of the coil 136, a captive retention means for the armature 68 in a state in which the electromagnetic actuator 66 has not yet been installed on the housing 30 of the parking lock module 10.

It can also be seen in FIGS. 7, 8 and 10 that the spring 64 for preloading the detent element 62 engages on the armature 68 and, here, is supported on the closure part 138 of the coil housing 130. More specifically, in FIG. 8 in particular, the armature 68 and the closure part 138 are equipped with mutually oppositely situated stepped bores 148, 150, which serve for accommodating the mutually averted ends of the spring 64. The spring 64 is a helical compression spring, which is guided in the electromagnetic actuator 66 by means of a cylindrical guide pin 152. Here, the guide pin 152 is suitably fixed, for example by being pressed in, in that bore portion of the stepped bore 148 of the armature 68 which is of relatively small diameter.

On the opposite side, the guide pin 152 is guided by means of a guide bushing 154 in that bore portion of the stepped bore 150 of the closure part 138 which is of relatively small diameter. The guide bushing 154 itself is pressed into the stepped bore 150 of the closure part 138.

It is again evident to a person skilled in the art that the detent element 62 which is fixedly connected to the armature 68 of the electromagnetic actuator 66 can, through suitable electrical energization of the electromagnetic actuator 66, more specifically of its coil 136, be lifted counter to the force of the spring 64 that is accommodated in the coil housing 130, such that the pin-like end 106 of the detent element 62 is released from the collar sleeve 98 of the piston 40 in the housing 30. The piston 40, released from the arresting device 46 by electromagnetic and/or hydraulic action, of the parking lock module 10 can then, in a manner dependent on the state of actuation of the parking lock 12, be moved from its unlocking position into its locking position by the spring force of the piston spring 44 or from its locking position into its unlocking position by hydraulic loading of the pressure chamber 48 in the housing 30, before said piston is fixed again in its respective position by means of the arresting device 46. For a defined detent position of the detent element 62 of the arresting device 46 in the housing 30, the base, provided with the aperture 104, of the cutout 100 in the housing 30 furthermore forms a stop for the detent element 62.

Figure 9:
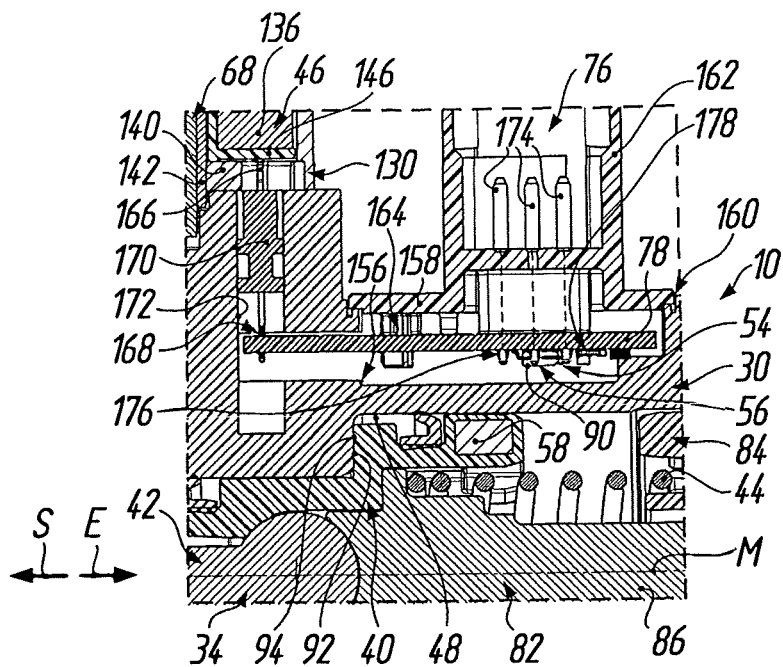
FIG. 9 shows a sectional view, cut away on all sides and on an enlarged scale, of the parking lock module as per FIG. 1 in accordance with the detail IX in FIG. 7.

With regard to further details of the electrical contacting of the electromagnetic actuator 66 of the arresting device 46 and of the position detector 56 of the sensor arrangement 54 with the aid of the common electrical interface 76 and the circuit board 78, reference is made in particular to FIGS. 7 to 9.

Accordingly, the housing 30 of the parking lock module 10 is equipped with a cutout 156 for tightly receiving the circuit board 78, which is rectangular as seen in plan view. The cutout 156 for receiving the circuit board 78 extends, in its main direction of extent, longitudinally with respect to the piston 40, that is to say along the central axis M of the housing 30.

Here, the circuit board 78 accommodated in the cutout 156 is oriented transversely with respect to the feed axis Z of the armature 68 of the electromagnetic actuator 66. Outwardly, the cutout 156 for receiving the circuit board 78 is closed off by means of a cover 158. The cover 158, which is likewise composed of a plastics material, is sealingly laser-welded in encircling fashion to the housing 30 of the parking lock module 10 at the reference designation 160 in FIGS. 2, 4 and 9.

As per in particular FIGS. 2, 4, 7, 9 and 11, the common electrical interface 76 for the electromagnetic actuator 66 of the arresting device 46 and the position detector 56 of the sensor arrangement 54 furthermore has a plug connector 162 attached to the housing 30 of the parking lock module 10. The plug connector 162 is oriented substantially transversely with respect to the central axis M of the piston 40, along which the piston 40 is longitudinally displaceable in the housing 30 of the parking lock module 10. In the exemplary embodiment illustrated, the plug connector 162 is formed on the cover 158 for the cutout 156 for receiving the circuit board 78, more specifically is formed integrally with the cover 158. Furthermore, the circuit board 78 is, at the reference designation 164 in FIGS. 9 and 11, fastened in a suitable manner to the cover 158 of the housing 30, for example by means of a mechanical clip connection or hot calking of fastening projections on the cover 158 which is composed of plastic.

Both the electromagnetic actuator 66 of the arresting device 46 and the position detector 56 of the sensor arrangement 54 are connected to the electrical interface 76 via the circuit board 78 which is attached to the housing 30. Here, the electromagnetic actuator 66 of the arresting device 46, more specifically the coil 136 thereof, is contacted with the circuit board 78 via contact pins 166 (to simplify the illustration, only one contact pin 166 is shown in the figures). The contact pins 166 are fixed in the circuit board 78 by means of a press-fit connection at the reference designation 168 in FIGS. 8 and 9. For mechanical stabilization, the contact pins 166 of the electromagnetic actuator 66 are held by means of a guide part 170 in a slot 172 of the housing 30 of the parking lock module 10, which slot runs transversely with respect to the cutout 156 for receiving the circuit board 78.

As is furthermore indicated in FIGS. 7 and 9, the plug connector 162 for the joint contacting of the electromagnetic actuator 66 of the arresting device 46 and of the position detector 56 of the sensor arrangement 54 is equipped with contact pins 174, which are likewise fixed in the circuit board 78 by means of a press-fit connection 176 (FIG. 9). It is finally also shown in FIG. 9 that, in the parking lock module 10, there are also integrated activation electronics 178, known per se, for the Hall element 90 of the position detector 56, said control electronics being arranged and interconnected on the circuit board 78. For the sensor arrangement 54, the circuit board 78 thus not only serves as a mechanical support of the position detector 56 but simultaneously also serves for the interconnection of the Hall element 90 of the position detector 56 with the associated activation electronics 178.

For a person skilled in the art, it is evident that the Hall element 90, arranged on that side of the circuit board 78 which faces towards the piston 40, of the position detector 56 is capable of detecting the position of the position encoder 58 (magnet), which is embedded in the piston 40, through the wall of the plastics housing 30, such that the respective actuation state of the parking lock module 10 can be acquired by means of the sensor arrangement 54. When the parking lock module 10 is installed in the motor vehicle, the technician merely has to join a plug (not shown) to the plug connector 162 in order to produce the electrical contact both with the electromagnetic actuator 66 of the arresting device 46 and with the position detector 56 of the sensor arrangement 54, that is to say to ensure a complete electrical connection of the parking lock module 10 in the motor vehicle.

A parking lock module has a housing, in which, for the actuation of a parking lock, a positioning member is movable between a locking position and an unlocking position. The positioning member is selectively fixable in at least one of these positions relative to the housing by means of an arresting device, which arresting device has a detent element which interacts with the positioning member for this purpose. The detent element is movable at least by means of an electromagnetic actuator between an arresting position and a release position. A sensor arrangement is furthermore provided which has at least one position detector, which is positionally fixed relative to the housing, and at least one position encoder, which, for the detection of the respective position, is operatively connected to the positioning member or to the detent element. The electromagnetic actuator is activatable by means of a circuit board which is attached to the housing and which, to simplify the installation and the contacting of the sensor arrangement, also bears the position detector of said sensor arrangement.

LIST OF REFERENCE DESIGNATIONS

10 Parking lock module
12 Parking lock
14 Parking lock wheel
16 Toothing
18 Pawl
20 Pivot axis
22 Locking tooth
24 Bore
26 Actuating element
28 Conical surface portion
30 Housing
32 Actuating mechanism
34 Actuating member
36 Metallic support plate
38 Support portion
40 Positioning member/piston
42 Piston rod
44 Piston spring
46 Arresting device
48 Pressure chamber
50 Piston rod spring
52 Stop
54 Sensor arrangement
56 Position detector
58 Position encoder
60 Detent contour
62 Detent element
64 Spring
66 Electromagnetic actuator
68 Armature
70 Fluidic actuator
72 Pressurizable effective surface
74 Piston
76 Electrical interface
78 Circuit board
80 Fastening hole
82 Thrust piece
84 Guide bushing
86 Guide extension
88 Opening
90 Hall element
92 Stop surface
94 Counterpart surface
96 Pressure port
98 Collar sleeve
100 Cutout
102 Guide sleeve
104 Aperture
106 Pin-like end
108 Annular pressure space
110 Pressure port
112 Connecting channel
114 Plastics plug
116 Depression
118 Seal arrangement
120 Sealing element
122 Sealing element
124 Cylindrical extension
126 Recess
128 Interference fit
130 Coil housing
132 Flange lug
134 Fastening screw
136 Coil
138 Closure part
140 Return-path plate
142 Bushing
144 Annular collar
146 Plastics encapsulation
148 Stepped bore
150 Stepped bore
152 Guide pin
154 Guide bushing
156 Cutout
158 Cover
160 Laser-welded connection
162 Plug connector
164 Circuit board fastening
166 Contact pin
168 Interference-fit connection 170 Guide part
172 Slot
174 Contact pin
176 Interference-fit connection
178 Activation electronics
E Unlocking direction
M Central axis/displacement axis
S Locking direction

The invention claimed is:

1. A parking lock module for actuating a parking lock in a motor vehicle, the parking lock module comprising:
a housing having an integrally formed pressure chamber;
a positioning member for the actuation of the parking lock, the positioning member is configured to be hydraulically moved between a locking position and an unlocking position in response to hydraulic loading of the pressure chamber, the positioning member is selectively fixable in at least one of the locking and unlocking positions relative to the housing with an arresting device, said arresting device has a detent element which interacts with the positioning member;
an electromagnetic actuator configured to move said detent element between an arresting position and a release position to fix the positioning member in the at least one of the locking and unlocking positions; and
a sensor arrangement having at least one position detector, said position detector being positionally fixed relative to the housing, and at least one position encoder, which, for the detection of the respective position, is operatively connected to the positioning member or to the detent element,
wherein said electromagnetic actuator of the arresting device is activatable with a circuit board attached to the housing,
wherein said circuit board bears the position detector of the sensor arrangement,
wherein said circuit board activates both said electromagnetic actuator and said position detector of the sensor arrangement, and
wherein said position detector of the sensor arrangement is connected via the circuit board to an electrical interface which is integrated in the parking lock module, the electrical interface having a plug connector which is attached to the housing of the parking lock module.

2. The parking lock module according to claim 1, wherein said housing of the parking lock module is equipped with a cutout for receiving the circuit board.

3. The parking lock module according to claim 2, wherein said cutout for receiving the circuit board extends longitudinally with respect to the positioning member.

4. The parking lock module according to claim 1, wherein said electromagnetic actuator of the arresting device has an armature which is operatively connected to the detent element and which is displaceable along a feed axis, wherein the circuit board is oriented transversely with respect to the feed axis.

5. The parking lock module according to claim 1, wherein said electromagnetic actuator of the arresting device is contacted with the circuit board with contact pins which are fixed in the circuit board with a press-fit connection.

6. The parking lock module according to claim 5, wherein said contact pins of the electromagnetic actuator of the arresting device are held with a guide part in a slot of the housing of the parking lock module, which slot runs transversely with respect to a cutout for receiving the circuit board.

7. The parking lock module according to claim 1, wherein, in the parking lock module, there are also integrated activation electronics for the position detector of the sensor arrangement, which activation electronics are arranged and connected on the circuit board.

8. The parking lock module according to claim 1, wherein said electromagnetic actuator of the arresting device and the position detector of the sensor arrangement are jointly contactable via the electrical interface.

9. The parking lock module according to claim 1, wherein said plug connector is oriented substantially transversely with respect to a displacement axis of the positioning member, along which displacement axis the positioning member is longitudinally displaceable in the housing of the parking lock module.

10. The parking lock module according to claim 1, wherein a cutout for receiving the circuit board is closed off with a cover on which the plug connector is formed.

11. The parking lock module according to claim 10, wherein said cover is laser-welded to the housing of the parking lock module.

12. The parking lock module according to claim 1, wherein said plug connector of the electrical interface is, for the joint contacting of the electromagnetic actuator of the arresting device and of the position detector of the sensor arrangement, equipped with contact pins which are fixed in the circuit board with a press-fit connection.

13. The parking lock module according to claim 1, wherein said position encoder is attached directly to the positioning member, wherein the positioning member is formed from a plastic, wherein the position encoder is embedded by encapsulation with the plastic.

* * * * *